(12) United States Patent
Mickelson et al.

(10) Patent No.: US 6,397,890 B1
(45) Date of Patent: Jun. 4, 2002

(54) VARIABLE METERING FLUID CONTROL VALVE

(75) Inventors: Roger Mickelson, West Burlington; Matthew J. Hennemann, Burlington, both of IA (US); David Swaim, Joliet, IL (US)

(73) Assignee: Case Corp., Racine, WI (US)

( * ) Notice: Subject to any disclaimer, the term of this patent is extended or adjusted under 35 U.S.C. 154(b) by 2 days.

(21) Appl. No.: 09/250,231

(22) Filed: Feb. 15, 1999

(51) Int. Cl.$^7$ ............................................. F16K 11/07
(52) U.S. Cl. ........................... 137/625.34; 137/625.69
(58) Field of Search ....................... 137/625.3, 625.34, 137/596.13, 625.69

(56) References Cited

U.S. PATENT DOCUMENTS

| | | | | |
|---|---|---|---|---|
| 1,582,896 A | * | 5/1926 | Berry ..................... | 137/625.34 |
| 3,556,155 A | * | 1/1971 | McWilliams ........... | 137/625.69 |
| 3,747,642 A | * | 7/1973 | Tolbert, Jr. ............ | 137/625.69 |
| 3,759,292 A | * | 9/1973 | Bianchetta et al. ......... | 137/596 |
| 3,791,413 A | * | 2/1974 | Muller et al. ............ | 137/625.3 |
| 3,817,276 A | * | 6/1974 | Schexnayder ............... | 137/491 |
| 3,862,643 A | * | 1/1975 | Dezelan et al. ......... | 137/625.63 |
| 4,076,552 A | * | 2/1978 | Farag et al. ................... | 127/50 |
| 4,122,868 A | * | 10/1978 | Holloway et al. ..... | 137/625.69 |
| 4,126,155 A | * | 11/1978 | Bertram .................. | 137/625.69 |
| 4,132,153 A | * | 1/1979 | Grotness et al. ......... | 137/625.3 |
| 4,245,816 A | * | 1/1981 | Johnson ...................... | 251/282 |
| 4,411,189 A | * | 10/1983 | Miller ......................... | 91/420 |
| 4,862,920 A | * | 9/1989 | Cleasby .................... | 137/625.3 |
| 5,682,744 A | * | 11/1997 | Hasegawa et al. ............ | 60/385 |

OTHER PUBLICATIONS

480D/480LL Service Manual, printed Jul. 1981, for Case Corporation—Valve Diagram No. 771307.
480D/480LL Service Manual, printed Jul. 1981, for Case Corporation—Valve Diagram No. 771311.

* cited by examiner

Primary Examiner—John Fox
(74) Attorney, Agent, or Firm—A. N. Trausch

(57) ABSTRACT

A variable metering fluid control valve comprising a valve body having at least one work port and one exhaust port with the ports in fluid communication with a spool bore and an exhaust core, said exhaust core having an exhaust core land and a reciprocating valve spool in the spool bore to control communication of fluid between the work port and the exhaust core, with said valve spool having a land portion with a plurality of variable length metering notches, wherein the land portion of the valve spool remains in contact with the exhaust core land through the full stroke of the valve spool. The variable length metering notches may be varied in width, depth, and cross-section so that precise control of the fluid system is achieved.

14 Claims, 3 Drawing Sheets

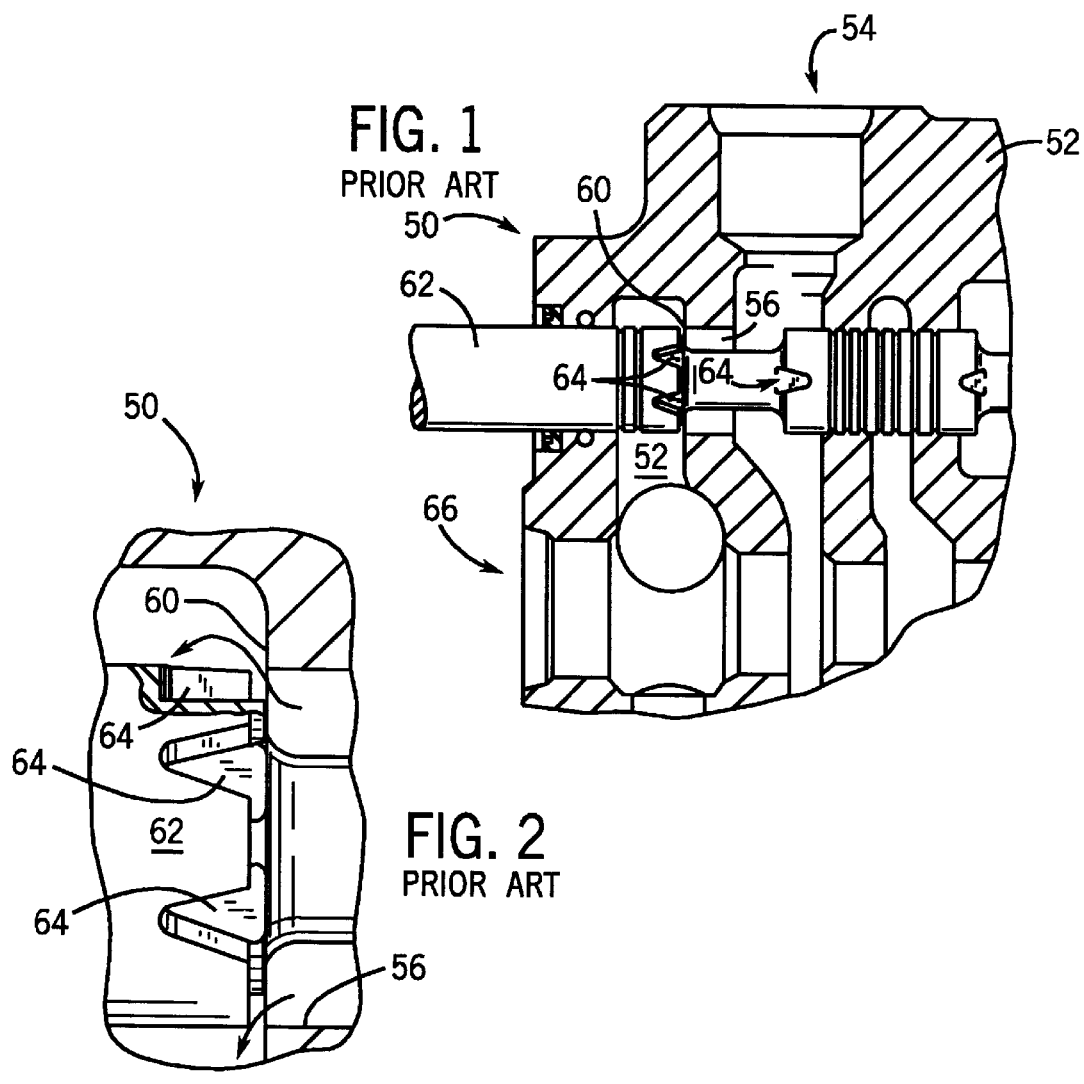
FIG. 1 PRIOR ART
FIG. 2 PRIOR ART
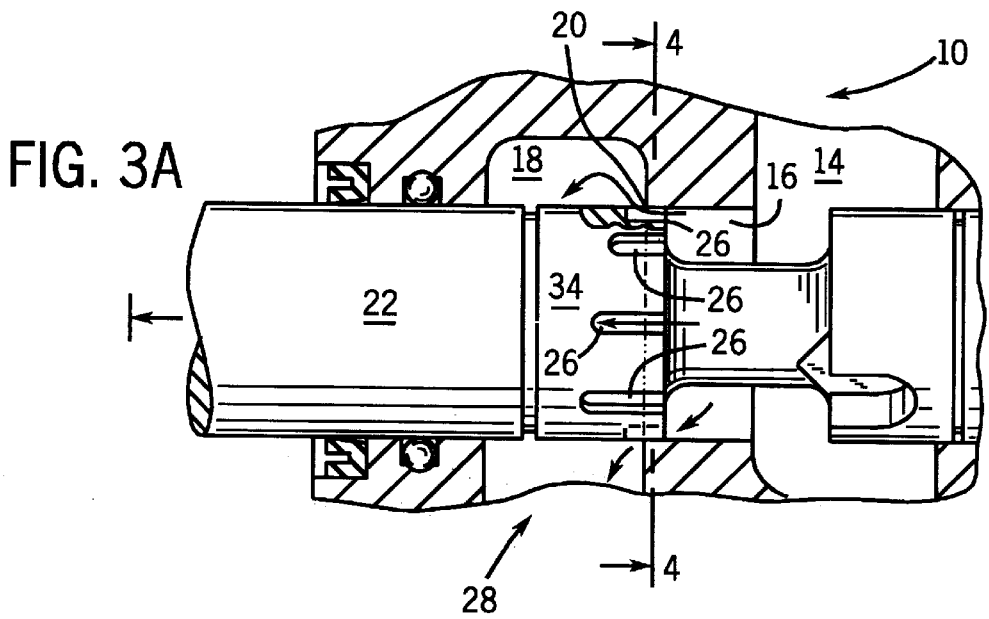
FIG. 3A

VARIABLE METERING FLUID CONTROL VALVE

FIELD OF THE INVENTION

The present invention relates to control valves of the type for use in construction equipment such as backhoe, skid steers, front end loaders, fluid cranes, etc. In particular, the present invention relates to a fluid control valve having metering which varies with associated valve stroke. The valve provides improved fluid control.

BACKGROUND OF THE INVENTION

Currently used hydraulic machines such as backhoes, front end loaders, skid steers, hydraulic cranes, etc. use hydraulic control valves to direct the motion of various functions on these machines such as swinging, booming, bucket dipping, and bucket rotation. The metering of these valves allows fine control of the various functions as the associated valve spool is moved to its closed position. There are typically three areas inside of a valve which have metering characteristics. These metering characteristics include open center metering, metering in, and metering out. Open center metering refers to choking off the open center flow of open center type control valves, which generate the pressure to move the associated load. Metering in refers to the metering of hydraulic fluid being metered from the valve into the cylinder, and metering out refers to hydraulic fluid being metered out of the cylinder through the valve.

The typical functions of hydraulic equipment currently use valve timing which is either slightly metered in, neutral or slightly metered out. Typically, valve designers avoid the use of heavy metering in or heavy metering out functions as a result of energy considerations. More specifically, depending upon the amount of metering, energy can be wasted since high metering restrictions usually result in the operation of the hydraulic pump such that the associated driving engine has to generate additional power to force oil through the restrictions associated with heavy metering. However, there are certain functions on hydraulic equipment such as a backhoe which are usually operated at relatively high pressures (e.g. the swinging motors), or have an overrunning load (e.g., the hydraulics associated with a boom) which have the potential to generate pressure appropriate to generate a metering out conditions. Thus, in certain circumstances such as those set out immediately above, it may be advantageous to only have heavy metering out on one side of the valve, thus, producing a non-symmetrical valve.

Most control valves have a spool which has metering notches which meter the flow when there is partial movement of the spool. In its fully open position, the open annulus between the undercut of the spool and the land in the associated spool housing opens up completely, thus effectively eliminating the function of the metering notches on the spool. The problem with this conventional type arrangement of metering notches is that the function of the metering notches is substantially lost when the spool is moved to and beyond the position where the undercut of the spool moves past the land in the associated spool housing. (See prior art FIGS. 1 and 2.)

As discussed above, for certain applications when fluid is released under pressure from a fluid cylinder such as a hydraulic cylinder or hydraulic motor, it is desirable in many applications to meter the flow out of such an actuator such that motion of the actuator is smoothly and/or controllably reduced or terminated. Thus, it would be desirable to provide a control valve operable to release the fluid from an actuator such that the release of fluid is metered throughout substantially the full range of valve motion while still retaining the ability to substantially increase the fluid flow through the valve while maintaining some degree of metering.

SUMMARY OF THE INVENTION

The control valve of this invention comprises a valve body which has a work port and an exhaust port. The ports are connected through a valve spool bore which provides fluid communication between the ports. A valve spool moves in the valve spool bore of the valve body to control the communication of fluid between the ports. A plurality of metering notches are spaced circumscriptively around a spool annular land on the valve spool. As the valve spool moves within the spool bore, the metering notches, which can be nested and can vary in length, width, depth and shape, are exposed thereby controlling the amount of fluid passing from one port to the other port.

The present invention provides an alternative embodiment being a variable metering fluid control valve comprises a valve body having at least one work port and one exhaust port with the ports in fluid communication with a spool bore and an exhaust core, said exhaust core having an exhaust core land and a reciprocating valve spool in the spool bore to control communication of fluid between the work port and the exhaust core, with said valve spool having an annular land portion with a plurality of variable length metering notches, wherein the annular land portion of the valve spool remains in contact with the exhaust core land through the full stroke of the valve spool. The variable length metering notches may be nested and may also be varied in width, depth, and cross-section so that precise control of the fluid system is achieved.

BRIEF DESCRIPTION OF THE DRAWINGS

FIG. 1 is a partial view of a prior art valve spool.

FIG. 2 is a close-up view of a prior art valve spool illustrating fluid flow (arrows) through notches in the spool.

FIG. 3A is a partial view of the present invention showing the variable length metering notches in the valve spool and illustrating the fluid flow (arrows) with the valve spool at full stroke positioned to expose all of the metering notches for fluid flow.

Figure 3B:
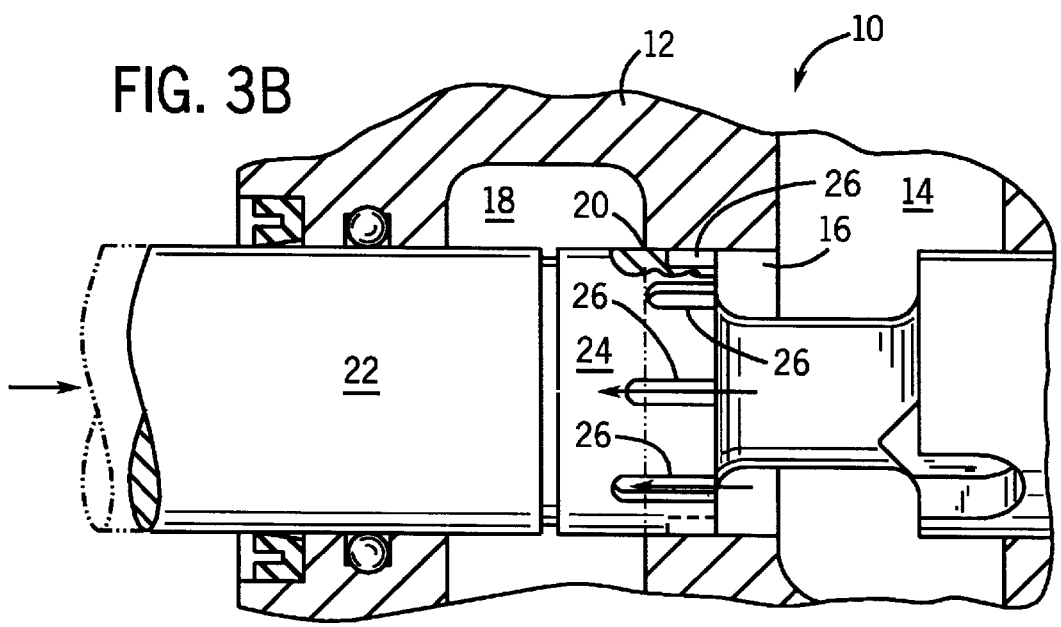
FIG. 3B is a partial view of the present invention showing the variable length metering notches in the valve spool and illustrating the fluid flow (arrows) with the valve spool positioned to expose only some of the metering notches for fluid flow.
Figure 4:
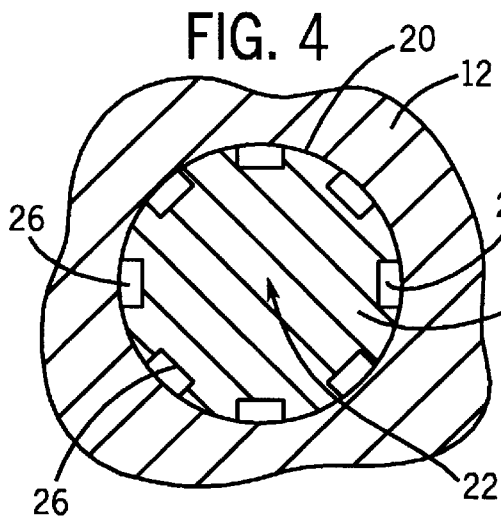
FIG. 4 is a cross sectional view taken at location 4—4 in FIG. 3A.
Figure 5:
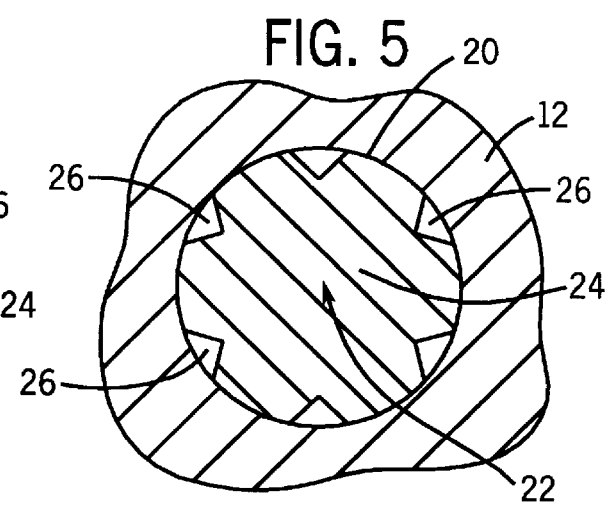
FIG. 5 is a cross sectional view of alternative notch geometry in the valve spool.
Figure 6:
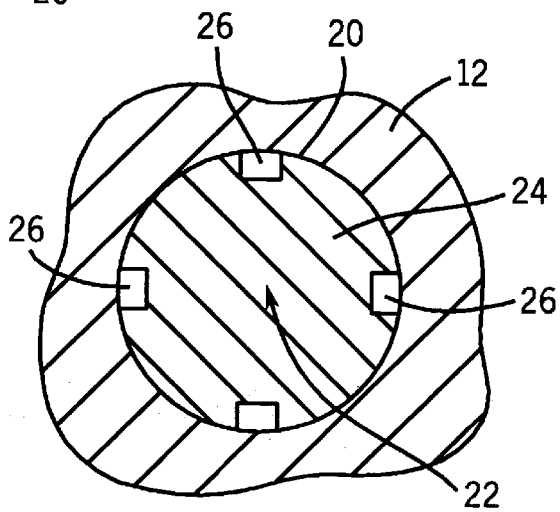
FIG. 6 is a cross sectional view of an alternative notch geometry in the valve spool.
Figure 7:
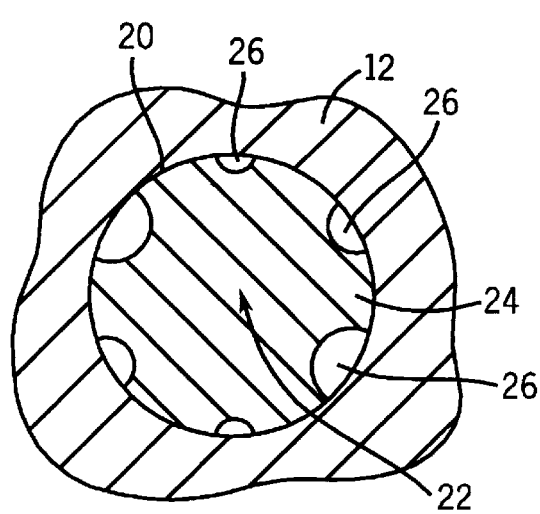
FIG. 7 is a cross sectional view of an alternative notch geometry in the valve spool.

Before explaining the preferred embodiment of the invention in detail it is to be understood that the invention is not limited in its application to the details of construction and the arrangement of the components set forth in the following description as illustrated in the drawings. The invention is capable of other embodiments or being practiced or carried out in various ways. Also, it is to be understood that the phraseology and terminology employed is for the purpose of description and should not be regarded as limiting.

DETAILED DESCRIPTION OF THE PREFERRED EMBODIMENT

FIGS. 1 and 2 illustrate an example of prior art control valve 50 metering notches 64. Typically, as the valve spool 62 moves to allow fluid to flow from the work port 54 to the exhaust core 58 through the spool bore 56, metering notches 64 are exposed. The further the valve spool 62 is moved to open (to left in the illustration) more of the notch 64 is exposed allowing more fluid to flow. In the fully opened position, the valve spool 62 exposes an open annulus between the undercut of the valve spool 62 and the land 60 in the valve body 52. See FIG. 2. At that time all the fluid can flow unmetered thereby losing the benefit of controlled fluid flow.

An exemplary embodiment of the present invention is illustrated in FIGS. 3A and 3B. A variable metering fluid control valve 10 is composed of a valve body 12 having at least one work port 14 and one exhaust port 28 with said parts in fluid communication with a spool bore 16. A valve spool 22 is slidably and reciprocatingly received in the spool bore 16 and is in contact with the interior of the bore in the valve body 12. An exhaust core land 20 exists at the conjunction of the exhaust core 18 in the valve body 12 and the spool bore 16. The valve spool 22 is provided with a round land portion 24 that slidably engages the spool bore 16. A plurality of spaced metering notches 26 are formed in the round land portion 24 of the valve spool 22. Said notches 26 are spaced circumscriptively around the spool round land 24. The metering notches 26 are of varying lengths as selected by the valve designer to accomplish the precise control of fluid flow in the valve body 12 from the work port 14 to the exhaust core 18 through the spool bore 16 and finally to the exhaust port 28. The metering notches 26 may also vary in cross section as to width, depth, shape and combinations thereof, as illustrated in FIGS. 4, 5, 6 and 7.

Figure 8:
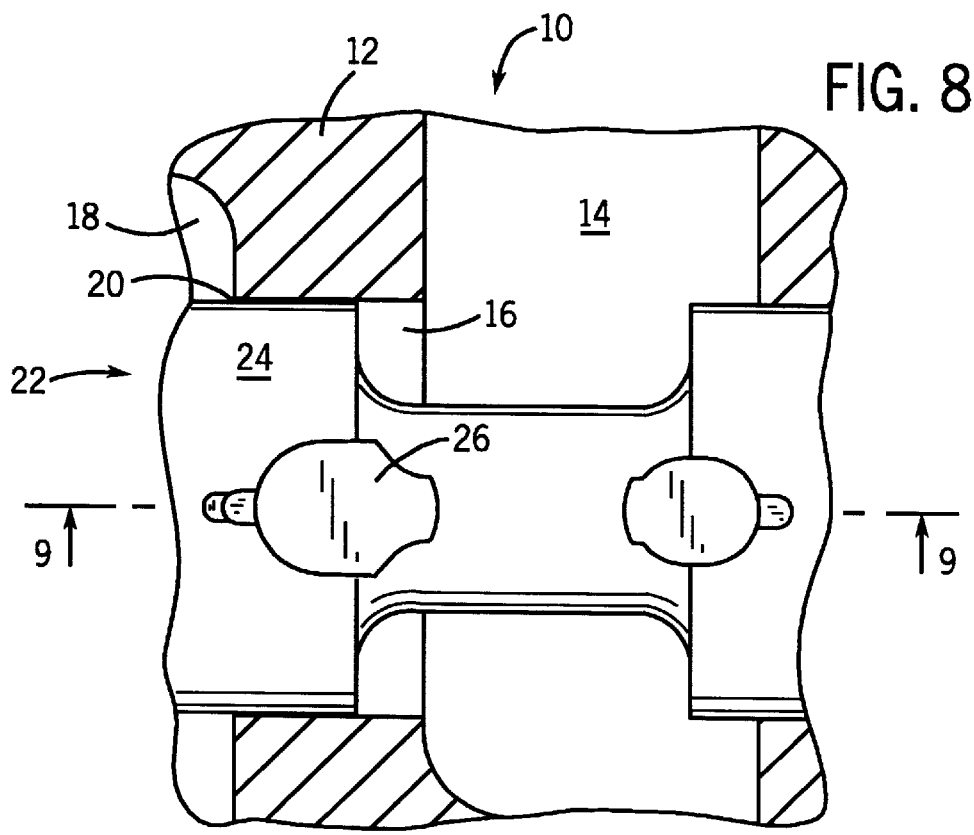
FIG. 8 is a partial view of the present invention illustrating the nested alternative notch geometry.
Figure 9:
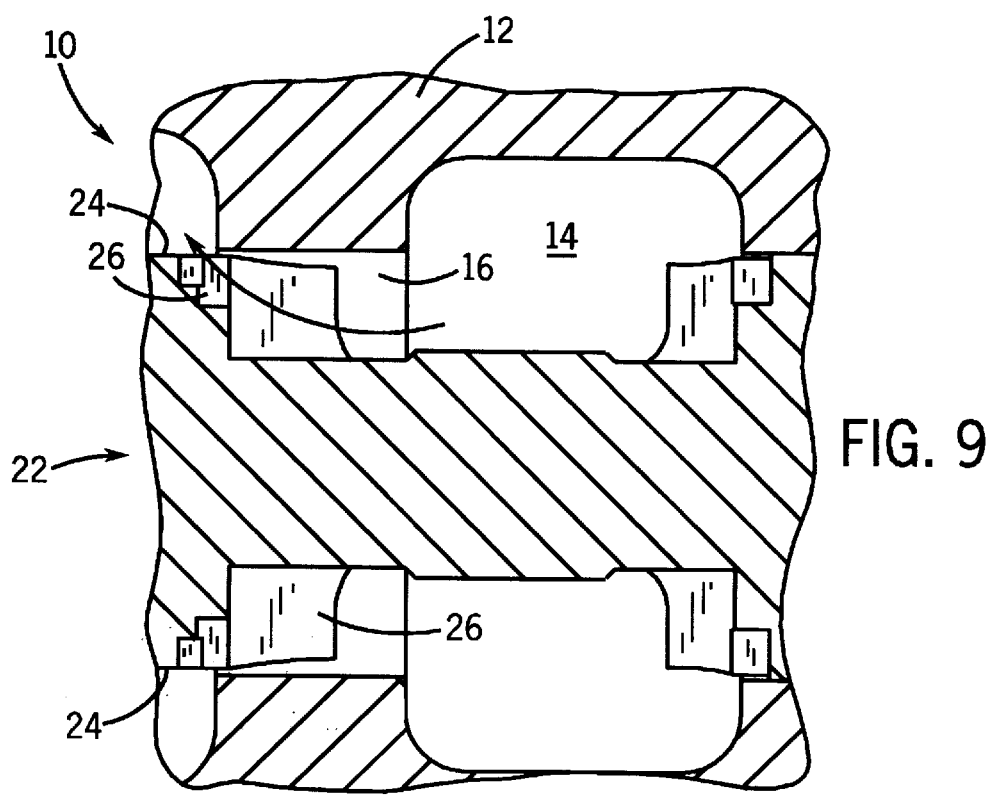
FIG. 9 is a cross sectional view of the nested alternative notch geometry shown in FIG. 8.

In operation, as the valve spool 22 slides in the spool bore 16 to the open position (left in the illustration in FIG. 3A) the metering notches 26 are exposed and fluid moves from the spool bore 16 to the exhaust core 18. With further movement additional notches 26 are exposed because of the varying lengths of the notches. The longer notches are exposed first with shorter notches exposed as spool movement continues. At the end of the spool movement, i.e., the full stroke of the valve spool 22, the round land portion 24 of the valve spool 22 is still in contact with the exhaust core land 20 of the valve body 12. As a result, control of fluid flow is maintained through the full stroke of the valve spool and cavitation in the fluid system is minimized. By varying the geometry and number of metering notches 26 in the round land portion 24 of the valve spool 22, the valve designer can precisely control the fluid system without the need to generate extra power to force fluid through the system and without allowing unrestricted fluid flow through an open annulus. FIGS. 4–9, inclusive, illustrate examples of such varying geometry and numbers of metering notches. FIGS. 8 and 9 specifically illustrate a nested version of the variable metering notches. A valve designer may also select to provide variable metering notches on only one end of a valve spool thereby providing a non-symmetrical control valve.

Thus it should be apparent that there has been provided in accordance with the present invention a fluid control valve having variable metering notches in the valve spool to control the communication of fluid during the full stroke of the valve spool. Although the invention has been described in conjunction with a specific embodiment thereof, it is evident that alternatives, modifications and variations will be apparent to those ordinarily skilled in the art. Accordingly, it is intended to embrace all such alternatives, modifications, and variations that fall within the spirit and scope of the appended claims.

What is claimed is:

1. A hydraulic open center control valve comprising:
    a valve body, that defines a spool bore, and having at least two ports and with each of said at least two ports in fluid communication through the spool bore with another of said at least two ports, and
    a valve spool movable in the spool bore to control communication of fluid between the at least two ports, the valve spool having a valve spool land and a plurality of nested metering notches spaced circumscriptively around the valve spool land, wherein the valve spool land maintains contact with the valve body and provides fluid flow only through the metering notches during a full stroke of the valve spool.

2. The control valve of claim 1, wherein the metering notches are of varying lengths.

3. The control valve of claim 1, wherein the metering notches are of varying widths.

4. The control valve of claim 1, wherein the metering notches are of varying depths.

5. The control valve of claim 1, wherein the metering notches vary in both width and length.

6. The control valve of claim 1, wherein the metering notches vary in both depth and length.

7. A variable metering hydraulic fluid open center control valve for construction equipment comprising:
    a valve body that defines a valve spool bore and an exhaust core, and having at least one port which is an exhaust port and at least one port which is a work port, wherein the exhaust port is in fluid communication with the valve spool bore and the exhaust core, said exhaust core having an exhaust core land; and
    a reciprocating valve spool disposed in the valve spool bore to control communication of fluid between the work port and the exhaust core, wherein the valve spool includes a land portion with a plurality of variable length nested metering notches, and wherein the land portion of the valve spool is configured to remain in contact with the exhaust core land, and further wherein metering is provided only through the metering notches during a full stroke of the valve spool.

8. The variable metering fluid control valve of claim 7, wherein at least one of the variable length metering notches also varies in width.

9. The variable metering fluid control valve of claim 7, wherein at least one of the variable length metering notches also varies in depth.

10. A hydraulic open center control valve comprising:
    a valve body defining a spool bore, a work port and an exhaust port, wherein the work port is interconnected for fluid communication with the exhaust port by the spool bore; and
    a valve spool slidably and reciprocatingly mounted in the spool bore and having a full stroke position therein, wherein the valve spool includes a means for variably controlling the communication of fluid between the work port and the exhaust port and for providing precise metering through only the variable control means at the full stroke position of the valve spool.

11. The control valve of claim 10, wherein the means for variably controlling the communication of fluid is a plurality of nested metering notches spaced around the valve spool.

12. The control valve of claim 11, wherein the metering notches are variable in length.

13. The control value of claim 12, wherein at least one of the variable length metering notches also varies in width.

14. The control valve of claim 12, wherein at least one of the variable length metering notches also varies in depth.

* * * * *